(12) United States Patent
Yun et al.

(10) Patent No.: US 7,439,939 B2
(45) Date of Patent: Oct. 21, 2008

(54) DISPLAY DEVICE HAVING MULTIPLE IMAGE DISPLAY UNITS

(75) Inventors: Young-Nam Yun, Seoul (KR); Hyung-Don Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/875,077

(22) Filed: Oct. 19, 2007

(65) Prior Publication Data

US 2008/0036692 A1 Feb. 14, 2008

Related U.S. Application Data

(62) Division of application No. 10/744,886, filed on Dec. 23, 2003, now Pat. No. 7,301,509.

(30) Foreign Application Priority Data

Sep. 17, 2003 (KR) ............................... 2003-64562

(51) Int. Cl.
*G09G 5/00* (2006.01)
(52) U.S. Cl. ......................................... 345/1.3; 345/1.1
(58) Field of Classification Search .................. 345/1.1, 345/1.3, 98, 102, 204; 455/566
See application file for complete search history.

(56) References Cited

U.S. PATENT DOCUMENTS

| | | | |
|---|---|---|---|
| 6,144,358 A | 11/2000 | Narayanaswamy et al. | |
| 6,346,698 B1 | 2/2002 | Turnbull | |
| 6,697,039 B1 | 2/2004 | Yamakawa et al. | |
| 6,812,989 B2 | 11/2004 | Kim | |
| 6,917,362 B2 | 7/2005 | Pinedo et al. | |
| 6,954,184 B2 | 10/2005 | Kurashima et al. | |
| 7,167,141 B2 | 1/2007 | Goto et al. | |
| 7,301,509 B2 * | 11/2007 | Yun et al. | 345/1.3 |
| 2003/0174270 A1 | 9/2003 | Kim | |
| 2004/0266475 A1 | 12/2004 | Mirza et al. | |
| 2006/0044396 A1 | 3/2006 | Miyashita et al. | |
| 2006/0256034 A1 | 11/2006 | McLarty et al. | |

FOREIGN PATENT DOCUMENTS

CN 1475838 2/2004

OTHER PUBLICATIONS

Chinese Office Action for application No. 200410005019.1 dated Jul. 27, 2007 with English translation.

* cited by examiner

*Primary Examiner*—Ricardo L Osorio
(74) *Attorney, Agent, or Firm*—Cantor Colburn LLP

(57) ABSTRACT

A display device includes a main display unit for displaying main images by processing main image data in response to main gate signals, a sub display unit for displaying sub images by processing sub image data in response to sub gate signals, a connection part for connecting the main and sub display units, a driver for providing the main image data and the main gate signals to the main display unit and the sub image data and the sub gate signals to the sub display unit, first connection lines disposed between the driver and the sub display unit to transfer the sub gate signals to the sub display unit, second connection lines disposed between the driver and the sub display unit to transfer the sub image data to the sub display unit, and a dummy line disposed between the first connection lines and an image display region of the main display unit.

21 Claims, 5 Drawing Sheets

DISPLAY DEVICE HAVING MULTIPLE IMAGE DISPLAY UNITS

CROSS REFERENCE TO RELATED APPLICATIONS

This application is a divisional application of U.S. application No. 10/744,886, filed Dec. 23, 2003, which claims priority to and the benefit of Korean Patent Application No. 2003-645 62, filed on Sep.17, 2003, all of which are incorporated by reference herein in their entirety.

BACKGROUND OF THE INVENTION

1. Field of the Invention

The present invention relates to a display device for display images, and more particularly to a display device having multiple display regions each displaying corresponding images, in which the multiple display regions are driven by a single driver.

2. Description of the Related Art

There are various kinds of electronic goods and appliances employing a display device for displaying images. Of such electronic goods and appliances, small-sized and/or portable electronic products also employ a display device that is designed to be smaller and lighter apt for the small-sized and/or portable products. Also, the display devices are designed to each have a structure fit to the use of each product.

For example, cellular phones generally have two types, flip type and folder type. A flip type cellular phone has a display device (e.g., a liquid crystal display panel) exposed outside, and a folder type cellular phone has a display device facing a keypad with data input keys. In the folder type cellular phones, the display device and the keypad are usually connected using a hinge.

The folder type cellular phones are further classified into a single panel type and a dual panel type. A single panel type cellular phone has a display device with a single display panel, and a dual panel type cellular phone has a display device with two display panels. A dual type cellular phone usually includes a main display panel for displaying main images and a sub display panel for displaying stand-by images such as time, date, etc. In the folder type cellular phone, the main display panel is not exposed outside when a display portion having the display device is folded. In contrast, the sub display panel is exposed to display the stand-by images even when the display portion is folded.

Generally, the main display panel includes data lines and gate lines. The data lines and the gate lines are formed on a display region of the main display panel. The main display panel also includes a data driver chip and a gate driver chip, which are disposed at a peripheral region. The data driver chip provides the data lines with a data signal, and the gate driver chip provides the gate lines with a gate signal to drive the main display panel.

The sub display panel also includes data line and gate lines, which are formed on a display region of the sub display panel, and a data driver chip and a gate driver chip, which are disposed at a peripheral region. The data driver chip provides the data lines with a data signal, and the gate driver chip provides the gate lines with a gate signal to drive the sub display panel.

In a dual panel type cellular phone, since the main and sub display panels each have its own data and gate driver chips, the overall size of the cellular phone is inevitably increased. Further, since the multiple chips are mounted on the main and sub display panels, the manufacturing time and cost increase so that its productivity decreases.

Therefore, a need exists for a display device which provides dual type display panels and has a smaller size and improved productivity.

SUMMARY OF THE INVENTION

The above-discussed and other drawbacks and deficiencies of the prior art are overcome or alleviated by the display device of the present invention.

A display device of the present invention, as an exemplary embodiment, includes a first display unit for displaying first images, which has first data lines for receiving first image data and first gate lines for receiving first gate signals, a second display unit for displaying second images, which has second data lines for receiving second image data and second gate lines for receiving second gate signals, a connection part for electrically connecting the first display unit and the second display unit, and a driver for providing the first image data and the first gate signals to the first display unit, and the second image data and the second gate signals to the second display unit, in which the driver is disposed in the first display unit.

The display device may also include first connection lines disposed between the driver and the second gate lines of the second display unit to transfer the second gate signals from the driver to the second gate lines, and a dummy line disposed between the first connection lines and an image display region of the first display unit. The dummy line and the first connection lines are disposed between the image display region and a contact region of the first display unit, in which the contact region has a voltage line to receive a reference voltage for the first display unit. The display device may also include second connection lines disposed between the driver and the second data lines of the second display unit to transfer the second image data from the driver to the second data lines.

In one embodiment, the driver includes a control section for receiving control signals externally provided to generate internal control signals, a data driving section for generating the first and second image data to the first and second display units, respectively, in response to a first internal control signal from the control section, and a gate driving section for generating the first and second gate signals to the first and second display units, respectively, in response to a second internal control signal from the control section. The gate driving section may include a first gate driving section for providing the first gate signals to the first gate lines of the first display unit in response to a first vertical control signal of the second internal control signal, and a second gate driving section for providing the second gate signals to the second gate lines of the second display unit in response to a second vertical control signal of the second internal control signal. The first gate driving section may include a first gate driver for driving a first set of the first gate lines of the first display unit, and a second gate driver for driving a second set of the first gate lines of the first display unit, in which the first and second gate drivers alternately provide the first gate signals to the first and second sets, respectively, of the first gate lines in response to the first vertical control signal of the second internal control signal.

In one embodiment, the first display unit includes a transistor formed at a selected position on a substrate, a first insulation layer formed on the transistor and the substrate, a pixel electrode formed on the first insulation layer and connected to a drain electrode of the transistor through a contact hole which is formed in the first insulation layer, a common electrode disposed to face the pixel electrode, and a liquid crystal layer disposed between the pixel electrode and the common electrode. The display device may further include a common voltage line receiving a reference voltage externally provided, a conductive spacer disposed between the common voltage line and the common electrode, in which the reference voltage applied to the common voltage line is transferred to the common electrode via the conductive spacer, first connection lines formed on the substrate to transfer second gate signals to the second gate lines of the second display unit, and a dummy line formed on the substrate and disposed between the first connection lines and an image display region on which the pixel electrode is disposed.

These and other objects, features and advantages of the present invention will become apparent from the following detailed description of illustrative embodiments thereof, which is to be read in connection with the accompanying drawings.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
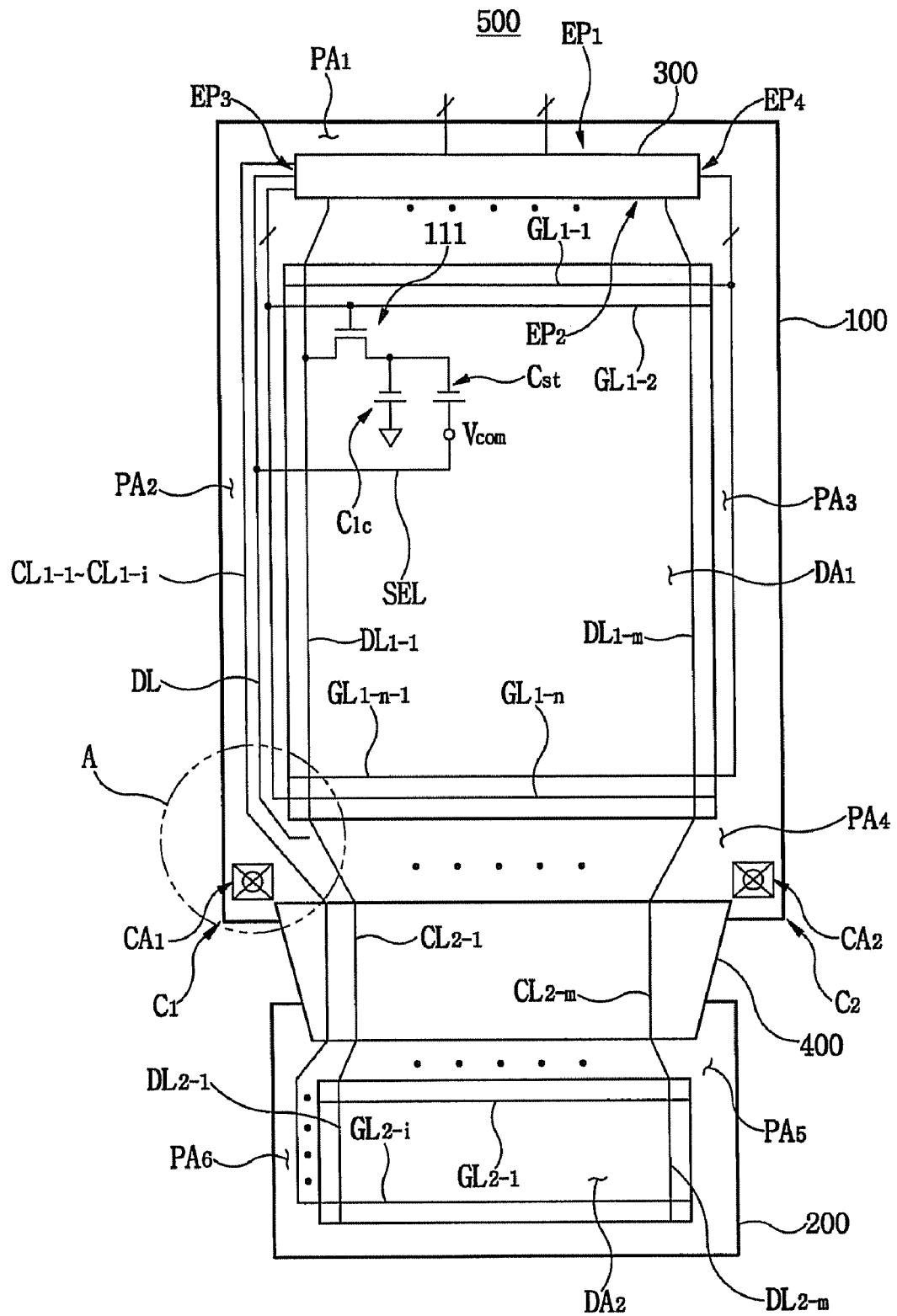
FIG. 1 is a schematic view illustrating a display device according to an exemplary embodiment of the present invention.
Figure 2:
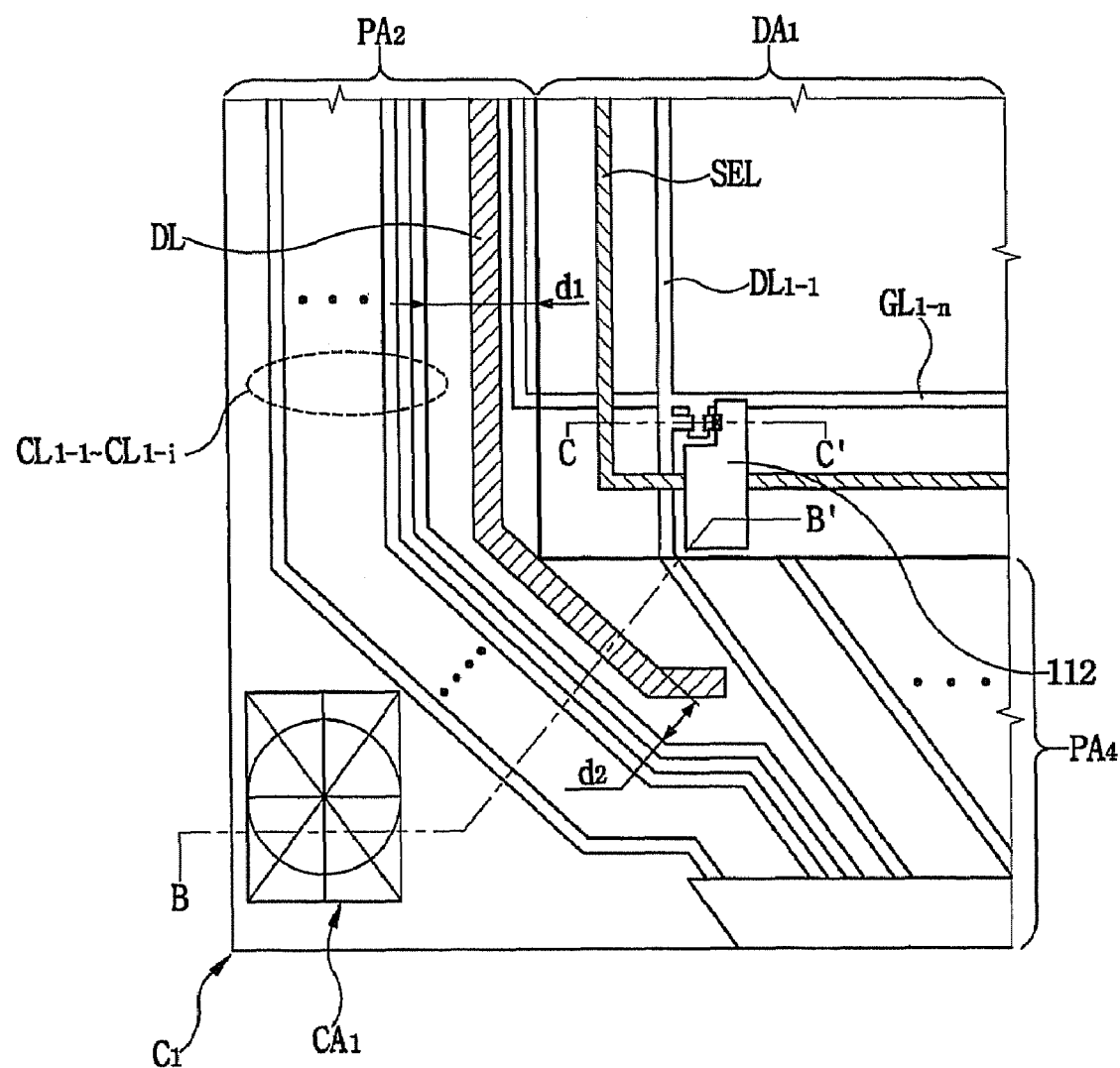
FIG. 2 is an enlarged view of portion A in FIG. 1.

FIG. 1 is a schematic view showing a display device according to an exemplary embodiment of the present invention, and FIG. 2 is an enlarged view of portion A in FIG. 1. Referring to FIG. 1, the display device 500 has a dual type structure including two display units 100, 200. The display device 500 includes a main display unit 100, a sub display unit 200 and a driver chip 300. The main and sub display units 100, 200 each have, for example, a liquid crystal display panel for displaying images thereon. The main and sub display units 100, 200 display main and sub images, respectively. The driver chip 300 drives the main and sub display units 100, 200.

The main display unit 100 includes a first display region DA1 and first through fourth peripheral regions PA1, PA2, PA3, PA4. The first display region DA1 is surrounded by the peripheral regions PA1, PA2, PA3, PA4. The sub display unit 200 includes a second display region DA2 and fifth and sixth peripheral regions PA5, PA6. The fifth and sixth peripheral regions PA5, PA6 are adjacent to the second display region DA2 and disposed at the opposite sides of the second display region DA2.

The first display region DA1 includes a plurality of gate lines GL1-1, GL1-2, GL1-n and a plurality of data lines DL1-1, DL1-2, . . . , DL1-m (here, 'n' and 'm' each represent a natural number equal to or greater than '2'). The gate lines GL1-1, GL1-2, . . . , GL1-n and the data lines DL1-1, DL1-2, . . . , DL1-m are insulated from each other.

A thin film transistor is connected to each of the gate lines GL1-1-GL1-n and corresponding one of the data lines DL1-1-DL1-m. For example, the thin film transistor 111 is electrically connected to the gate line GL1-2 and the data line DL1-1. In detail, a gate electrode of the thin film transistor 111 is electrically connected to the gate line GL1-2, and a source electrode of the thin film transistor 111 is electrically connected to the data line DL1-1. A drain electrode of the thin film transistor 111 is electrically connected to a liquid crystal capacitor Clc and a storage capacitor Cst.

The liquid crystal capacitor Clc is formed with a pixel electrode 112 and a common electrode 122 (referring to FIG. 4), which face each other. An electric field is formed between the pixel electrode 112 and the common electrode 122 when a pixel voltage is applied to the pixel electrode 112. The storage capacitor Cst is formed with the pixel electrode 112 and a storage electrode line SEL. The pixel electrode 112 and the storage electrode line SEL face each other, and an insulation layer (not shown) is interposed between the pixel electrode 112 and the storage electrode line SEL. The storage capacitor Cst is electrically connected to the liquid crystal capacitor Clc in parallel to maintain a voltage of the liquid crystal capacitor Clc.

The second display region DA2 includes a plurality of gate lines GL2-1, GL2-2, . . . , GL2-i, and a plurality of data lines DL2-1, DL2-2, . . . , DL2-m, (here, 'i' and 'm' each represent a natural number equal to or greater than '2'). The number of the gate lines GL2-1-GL2-i is equal to or smaller than the number of the data lines DL2-1-DL2-m.

The main display unit 100 is has a larger size than that of the sub display unit 200. Thus, the first display region DA1 is larger than the second display region DA2, and the first display region DA1 has higher resolution than that of the second display region DA2. In this embodiment, the number of the first data lines DL1-1-DL-m is equal to the number of the second data lines DL2-1-D12-m. In other embodiments, however, the number of the second data lines may be smaller than the number of the first data lines.

The second display region DA2 has the substantially same structure as that of the first display region DA1 except for the number of the gate lines. Thus, a detailed description of the second display region DA2 is omitted to avoid duplication.

The driver chip 300 for driving the main and sub display units 100 and 200 is disposed at the first peripheral region PA1. The driver chip 300 generates first gate signals and first data signals for driving the main display unit 100. The driver chip 300 also generates second gate signals and second data signals for driving the sub display unit 200. The driver chip 300 includes first, second, third and fourth end portions EP1, EP2, EP3, EP4. The first end portion EP1 is adjacent to the upper edge of the main display unit 100. The second end portion EP2 faces the first end portion EP1. The third and fourth end portions EP3, EP4 are disposed at the opposite sides, respectively, of the driver chip 300 to connect the first and second end portions EP1, Ep2.

External signals are applied to the driver chip 300 via the first end portion EP1, and the first and second data signals are applied to the first and second data lines, respectively, via the second end portion EP2. The driver chip 300 provides the first gate signals to the even numbered ones of the first gate lines GL1-2-GL1-n via the third end portion EP3. The driver chip 300 also provides the second gate signals to the first connection lines CL1-1-CL1-i via the third end portion EP3. Further, a reference voltage (or common voltage) Vcom is applied to the storage electrode line SEL via the third end portion EP3.

The driver chip 300 provides the first gate signals to the odd numbered ones of the first gate lines GL1-1-GL1-(n−1) via the fourth end portion EP4.

The main display unit 100 and the sub display unit 200 are electrically connected to each other via a flexible printed circuit board (hereinafter, referred to as "FPC") 400. A first end portion of the FPC 400 is attached on the fourth peripheral region PA4 of the main display unit 100. A second end portion of the FPC 400 is attached on the fifth peripheral region PA5 of the sub display unit 200. The FPC 400 also provides a structural connection between the main and sub display units 100, 200 such that the main and sub display units 100, 200 are foldable toward each other at the FPC 400.

The first connection lines CL1-1-CL1-$i$ are formed at the second and fourth peripheral regions PA2, PA4 and the FPC 400. The first connection lines CL1-1-CL1-$i$ electrically connect the driver chip 300 and the second gate lines GL2-1-GL2-$i$. Thus, the second gate signals from the driver chip 300 are applied to the second gate lines GL2-1-GL2-$i$ via the first connection lines CL1-1-CL1-$i$.

Second connection lines CL2-1-CL2-$m$ are formed on the fourth peripheral region PA4 and the FPC 400. The second connection lines CL2-1-CL2-$m$ electrically connect the first data lines DL1-1-DL1-$m$ in the main display unit 100 and the second data lines DL2-1-DL2-$m$ in the sub display unit 200. Thus, the second data signals from the driver chip 300 are applied to the second data lines DL2-1-DL2-$m$ via the second connection lines CL2-1-CL2-$m$. Owing to such connection configuration, the driver chip 300 is able to drive the sub display unit 200, although it is disposed at the first peripheral region PA1 of the main display unit 100.

The main display unit 100 includes first and second contact regions CA1, CA2. The first and second contact regions CA1, CA2 are formed at the first and second corners C1, C2 of the main display unit 100, respectively. A first common voltage line CVL (referring to FIG. 5) is formed at the first contact region CA1, and a second common voltage line (not shown) is formed at the second contact region CA2.

Figure 5:
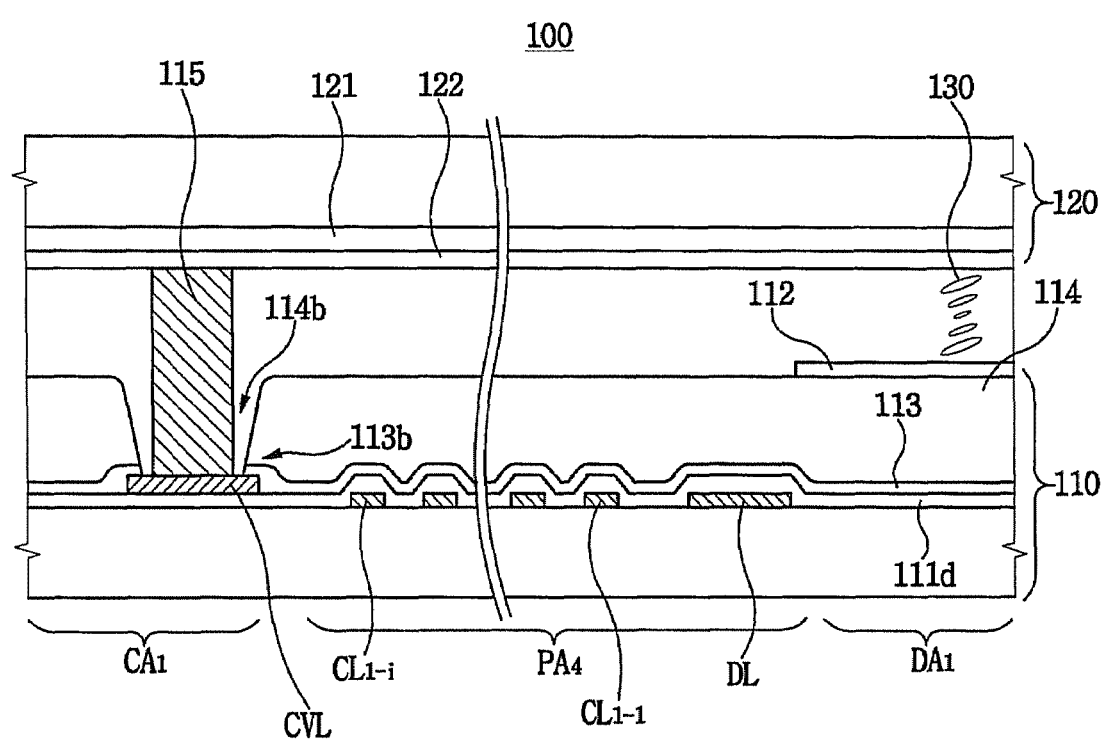
FIG. 5 is a cross-sectional view of the display device taken along the line B-B' in FIG. 2.

The first common voltage line CVL is electrically connected to the common electrode 122 via a first conductive spacer 115 (referring to FIG. 5). The first common voltage line CVL receives the reference voltage (or common voltage) from an external device or the driver chip 300. The second common voltage line is electrically connected to the common electrode 122 via a second conductive spacer (not shown). When the first common voltage line CVL is opened so that the common voltage is not applied to the common electrode, the common voltage is applied to the common electrode via the second common voltage line. The first and second contact region CA1 and CA2 will be explained further referring to FIG. 5.

A dummy line DL is formed at the second and fourth peripheral regions PA2, PA4. The dummy line DL is interposed between the first connection lines CL1-1-CL1-I and the first display region DA1. The dummy line DL is electrically connected to the storage electrode line SEL at the second peripheral region PA2.

As shown in FIG. 2, the first connection lines CL1-1-CL1-$i$ at the second peripheral region PA2 are spaced apart from the first display region DA1 by a first distance d1. In contrast, the first connection lines CL1-1-CL1-$i$ at the first corner C1 (i.e., the common area of the second and fourth peripheral regions PA2, PA4) are spaced apart from the first display region DA1 by a second distance d2 that is smaller than the first distance d1. In other words, the distance between the first connection lines CL1-1-CL1-I and the first display region DA1 is smaller at the first corner C1 than at other regions because the first contact region CA1 is formed at the first corner C1.

The dummy line DL effectively reduces parasitic capacitance between the first connection lines CL1-1-CL1-$i$ and the first display region DA1 at the first corner C1. This will be explained in detail referring to FIG. 5.

Figure 3:
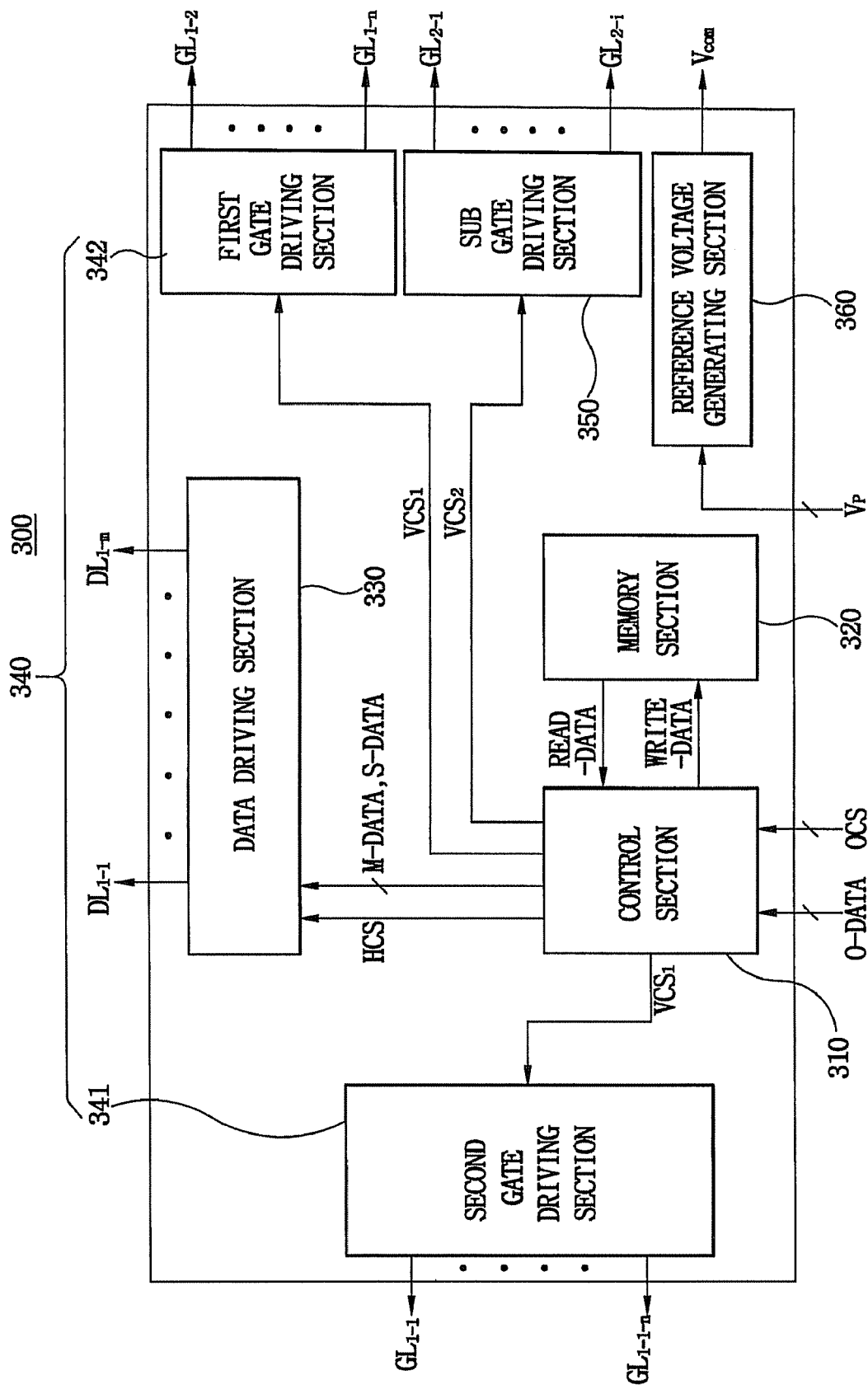
FIG. 3 is a block diagram illustrating the driver chip in FIG. 1.

FIG. 3 is a block diagram illustrating the driver chip 300 in FIG. 1. Referring to FIG. 3, the driver chip 300 includes a control section 310, a memory section 320, a data driving section 330, a main gate driving section 340 and a sub gate driving section 350.

The control section 310 receives primitive image data O-DATA and a primitive control signal OCS. The primitive image data O-DATA includes red, green and blue image data. The primitive control signal OCS includes a vertical synchronizing signal, a horizontal synchronizing signal and main clock signal. The control section 310 transfers the primitive image data O-DATA to the memory section 320, so that the memory section 320 stores the primitive image data O-DATA. The control section 310 reads out the primitive image data O-DATA from the memory section 320, for example, line by line, in response to the primitive control signal OCS. Then, the control section 310 provides the data driving section 330 with main and sub image data M-DATA and S-DATA.

The control section 310 also provides an internal control signal (e.g., a horizontal control signal HCS) to the data driving section 330. The data driving section 330 provides the first and second data lines DL1-1-DL1-$m$, DL2-1-DL2-$m$ with the main and sub image signals M-DATA, S-DATA, respectively, transferred from the control section 310 in response to the horizontal control signal HCS.

The control section 310 also provides another internal control signal to the main and sub gate driving sections 340, 350. In other words, the control section 310 provides a first vertical control signal VCS1 to the main gate driving section 340 and a second vertical control signal VCS2 to the sub gate driving section 350.

The main gate driving section 340 includes first and second gate driving sections 341 and 342. The first gate driving section 341 is electrically connected to the odd numbered first gate lines GL1-1-GL1-(n−1), and the second gate driving section 342 is electrically connected to the even numbered first gate lines GL1-2-GL1-$n$. The first and second gate driving sections 341, 342 alternately provide the first gate signals to the first gate lines GL1-1-GL1-$n$. The sub gate driving section 350 outputs the second gate signals in response to the second vertical control signal VCS2 provided from the control section 310. The second gate signals are provided to the second gate lines GL2-1-GL2-$i$ via the first connection lines CL1-1-CL1-$i$ (referring to FIG. 1).

The data driving section 330 provides the main and sub image data M-DATA, S-DATA to the first and second data lines DL1-1-DL1-$m$, DL2-1-DL2-$m$ in response to the horizontal control signal HCS. The main image data M-DATA from the data driving section 330 is applied to the first data lines DL1-1-DL1-$m$. The sub image data S-DATA is applied to the second data lines DL2-1-DL2-$m$ via the first data lines DL1-1-DL1-$m$ and the second connection lines CL2-1-CL2-$m$.

The driver chip 300 further includes a reference voltage generating section (or common voltage generating section) 360 for generating a reference voltage (or common voltage) Vcom. The reference voltage generating section 360 receives a driving voltage Vp externally provided and transforms it into the reference voltage Vcom. The reference voltage Vcom is provided to the storage electrode line SEL (referring to FIG.

1). Then, the reference voltage Vcom is applied to the dummy line DL via the storage electrode line SEL.

Figure 4:
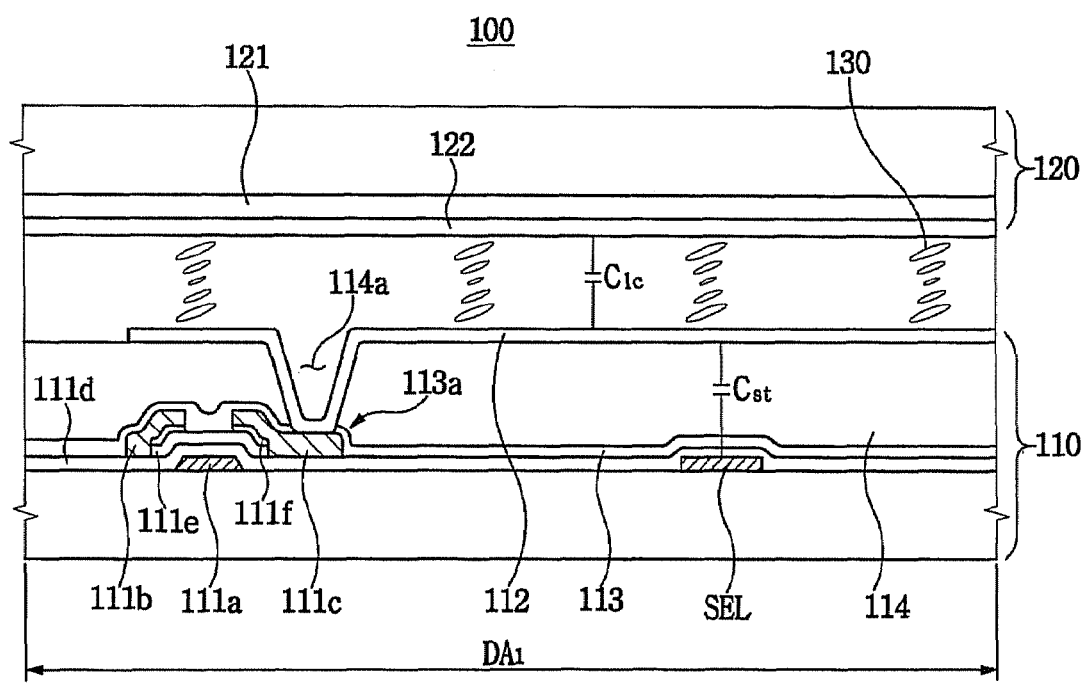
FIG. 4 is a cross-sectional view of the display device taken along line C-C' in FIG. 2.

FIG. 4 is a cross-sectional view of the display device taken along line C-C' in FIG. 2, and FIG. 5 is a cross-sectional view of the display device taken along line B-B' in FIG. 2. Referring to FIG. 4, the main display unit 100 includes an array substrate 110, a color filter substrate 120 and a liquid crystal layer 130. The liquid crystal layer 130 is interposed between the array substrate 110 and the color filter substrate 120, which face each other.

The array substrate 110 includes a thin film transistor 111, an inorganic insulation layer 113, an organic insulation layer 114 and a pixel electrode 112. The thin film transistor 111 is formed at the first display region DA1. The inorganic insulation layer 113 covers the thin film transistor 111. The organic insulation layer 114 levels the surface of the array substrate 110. The pixel electrode 112 is formed on the organic insulation layer 114. The thin film transistor 111 includes a gate electrode 111a, a source electrode 111b and a drain electrode 111c. The gate electrode 11a is insulated from the source electrode 111b and the drain electrode 111c by a gate insulation layer 111d.

An active pattern 111e and an ohmic contact pattern 111f are formed on the gate insulation layer 111d. Current flows through the active pattern 111e and the ohmic contact pattern 111f, when a potential difference is applied between the source electrode 111b and the drain electrode 111c. The source electrode 111b and the drain electrode 111c are formed on the active pattern 111e and the ohmic contact pattern 111f.

As shown in FIGS. 1 to 4, the gate electrode 111a receives the first gate signal through the gate line GL1-2. The source electrode 111b receives the first data signal through the data line DL1-1. When the thin film transistor 111 is turned on in response to the first gate signal, the first data signal applied to the source electrode 111b is transferred to the drain electrode 111c to be transferred to the pixel electrode 112.

The storage electrode line SEL is disposed at one side of the thin film transistor 111. The insulation layers 111d, 113, 114 are formed between the storage electrode line SEL and the pixel electrode 112, which face each other. In this embodiment, the storage electrode line SEL and the gate electrode 111a are formed on the same layer. Also, for example, the storage electrode line SEL and the gate electrode 111a may be formed simultaneously. In other embodiments, however, the storage electrode line SEL may be formed on the same layer and/or simultaneously with the source electrode 111b and/or the drain electrode 111c.

The inorganic insulation layer 113 is formed on the thin film transistor 111 and the gate insulation layer 111d so as to protect the thin film transistor 111. A first contact hole 113a is formed at a selected position in the inorganic insulation layer 113 to expose the drain electrode 111c of the thin film transistor 111. The inorganic insulation layer 113 is made of material comprising, for example, silicon nitride (SiNx) or silicon oxide (SiOx).

The organic insulation layer 114 is formed on the inorganic insulation layer 113. The organic insulation layer 114 is provided with a flat surface so that the array substrate 110 has the leveled surface. A second contact hole 114a is formed at a selected position in the organic insulation layer 114, such that the second contact hole 114a is disposed over the first contact hole 113a. Thus, the drain electrode 111c is exposed via the first and second contact holes 113a, 114a. The organic insulation layer 114 is made of material comprising, for example, acryl resin.

The pixel electrode 112 is formed on the organic insulation layer 114. The pixel electrode 112 is electrically connected to the drain electrode 111c via the first and second contact holes 113a, 114a, so that the first data signal applied to the drain electrode 111c is transferred to the pixel electrode 112. The pixel electrode 112 is made of material comprising, for example, indium tin oxide (ITO) or indium zinc oxide (IZO). The indium tin oxide and the indium zinc oxide are electrically conductive and transparent.

The color filter substrate 120 includes a color filter 121 and the common electrode 122. The color filter 121 includes a red-color filter, a green-color filter and a blue-color filter. The common electrode 122 is formed on the color filter 121. The common electrode is made of material comprising, for example, indium tin oxide or indium zinc oxide.

The liquid crystal capacitor Clc is formed with the pixel electrode 112, the common electrode 122 and the liquid crystal layer 130 interposed between the pixel electrode 112 and the common electrode 122. When a pixel voltage is applied to the pixel electrode 112, an electric field is formed between the pixel electrode 112 and the common electrode 122. The storage capacitor Cst is formed with the pixel electrode 112, the storage electrode line SEL, and the inorganic and organic insulation layers 113, 114 interposed between the storage electrode line SEL and the pixel electrode 112. The storage capacitor Cst is electrically connected to the liquid crystal capacitor Clc to maintain the voltage applied to the liquid crystal capacitor Clc.

Referring to FIG. 5, the first connection lines CL1-1-CL1-i and the dummy line DL are formed at the fourth peripheral region PA4 and in the array substrate 100. The gate insulation layer 111d, the inorganic insulation layer 113 and the organic insulation layer 114 at the first display region DA1 are formed in sequence on the first connection lines CL1-1-CL1-i. The pixel electrode 112 is formed on the organic insulation layer 114 at the first display region DA1.

The first common voltage line CVL is formed at the first contact region CA1. The first common voltage line CVL may be formed on the same layer on which the gate electrode 111a or the source electrode 111b is formed. A third contact hole 113b is formed at a selected position in the inorganic insulation layer 113, and a fourth contact hole 114b is formed at a selected position in the organic insulation layer 114. The first common voltage line CVL is exposed via the third and fourth contact holes 113b, 114b, which may be configured in alignment.

The first conductive spacer 115 is formed between the first common voltage line CVL of the array substrate 110 and the common electrode 122 of the color filter substrate 120. The first conductive spacer 115 is extended via the third and fourth contact holes 113b, 114b to electrically connect the common electrode 122 and the first common voltage line CVL. Thus, a reference voltage (or common voltage) applied to the first common voltage line VCL is transferred to the common electrode 122 via the first conductive spacer 115.

Referring again to FIG. 1, the main display unit 100 has the first and second contact regions CA1, CA2, which are disposed at the opposite sides, respectively, of the main display unit 100. Since the second contact region CA2 has the substantially same structure as that of the first contact region CA1 as shown in FIG. 5, a detailed description of the second contact region CA2 is omitted to avoid duplication.

In the sub display unit 200, images are displayed on the second display region DA2 when the second gate signals are applied to the first connection lines CL1-1-CL1-i. In this case, the dummy line DL disposed between the first connection lines CL1-1-CL1-i and the first display region DA1 is maintained to have the reference voltage Vcom. Thus, the second gate signals applied to the first connection lines CL1-1-CL1-$i$ have no or little influence on the pixel electrode 112 of the main display unit 100 even when the first connection lines CL1-1-CL1-$i$ are disposed close to the first display region DA1. Thus, parasitic capacitance, which would be otherwise produced between the first connection lines CL1-$i$-CL1-I and the pixel electrode 112, is prevented or effectively reduced. Parasitic capacitance is known to induce light leakage in the main display unit 100. Since parasitic capacitance is effectively reduced or prevented in the present invention, the display quality of the main display unit is substantially enhanced. Thus, the display device of the present invention improves the display quality of the main and sub display units which are driven by the single driver chip.

Having described the exemplary embodiments of the display device according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A display device for displaying images, comprising:
    a main display unit to display main images by processing main image data in response to main gate signals;
    a sub display unit to display sub images by processing sub image data in response to sub gate signals;
    a connection part to connect the main and sub display units such that the main and sub display units are foldable toward each other at the connection part;
    a driver to provide the main image data and the main gate signals to the main display unit and the sub image data and the sub gate signals to the sub display unit, the driver being disposed in the main display unit;
    first connection lines disposed between the driver and the sub display unit to transfer the sub gate signals to the sub display unit;
    second connection lines disposed between the driver and the sub display unit to transfer the sub image data to the sub display unit; and
    a dummy line disposed between the first connection lines and an image display region of the main display unit.

2. The display device of claim 1, wherein the dummy line is provided with a reference voltage when the first connection lines transfer the sub gate signals.

3. The display device of claim 1, wherein the dummy line and the first connection lines are disposed between the image display region of the main display unit and a contact region of the main display unit, the contact region having a voltage line to receive a reference voltage for the main display unit.

4. The display device of claim 1, further including second connection lines disposed between the driver and a sub data lines of the sub display unit to transfer the sub image data from the driver to the second data lines.

5. The display device of claim 1, wherein the main display unit has an image display region larger than an image display region of the sub display unit.

6. The display device of claim 1, wherein the connection part comprises a flexible printed circuit board having a first end portion connected with a lower region of the main display unit and a second end portion, which is opposite to the first end portion, connected with a upper region of the sub display unit.

7. The display device of claim 1, wherein the driver comprises:
    a control section for receiving control signals externally provided to generate internal control signals;
    a data driving section for generating the first and sub image data to the first and sub display units, respectively, in response to a first internal control signal from the control section; and
    a gate driving section for generating the first and sub gate signals to the first and sub display units, respectively, in response to a second internal control signal from the control section.

8. The display device of claim 7, wherein the gate driving section comprises:
    a first gate driving section for providing the main gate signals to main gate lines of the main display unit in response to a first vertical control signal of the second internal control signal; and
    a second gate driving section for providing the sub gate signals to sub gate lines of the sub display unit in response to a second vertical control signal of the second internal control signal.

9. The display device of claim 8, wherein the first gate driving section comprises:
    a first gate driver for driving a first set of the main gate lines of the main display unit; and
    a second gate driver for driving a second set of the main gate lines of the main display unit,
    wherein the first and second gate drivers alternately provide the main gate signals to the first and second sets, respectively, of the main gate lines in response to the first vertical control signal of the second internal control signal.

10. The display device of claim 9, wherein the first set of the main gate lines comprises odd numbered lines of the main gate lines, and the second set of the main gate lines comprises even numbered lines of the main gate lines.

11. The display device of claim 7, further including a memory for storing image data externally provided, wherein the control section controls data read and data write from and into the memory.

12. The display device of claim 7, further including a reference voltage generation section for receiving a driving voltage externally provided to generate a reference voltage to be provided to the first and sub display units.

13. The display device of claim 1, wherein the main display unit comprises:
    a transistor formed at a selected position on a substrate;
    a first insulation layer formed on the transistor and the substrate;
    a pixel electrode formed on the first insulation layer, the pixel electrode being connected to a drain electrode of the transistor through a contact hole which is formed through the first insulation layer;
    a common electrode facing the pixel electrode; and
    a liquid crystal layer disposed between the pixel electrode and the common electrode.

14. The display device of claim 13, further comprising a storage electrode line formed on the substrate, a storage capacitance being formed between the storage electrode line and the pixel electrode.

15. The display device of claim 14, wherein a liquid crystal capacitance is formed between the pixel electrode and the common electrode in association with the storage capacitance.

16. The display device of claim 14, wherein the storage electrode line and a gate electrode of the transistor are formed on the substrate simultaneously.

17. The display device of claim 13, wherein the first insulation layer comprises:
    an inorganic insulation layer formed on the transistor and the substrate; and an organic insulation layer formed on the inorganic insulation layer, the organic insulation layer having a leveled surface.

18. the display device of claim 17, wherein the inorganic insulation layer has a first contact hole formed on the drain electrode of the transistor and the organic insulation layer has a second contact hole formed on the first contact hole to expose the drain electrode so that a portion of the drain elcetrode exposed by the first and second contact holes is connected with the pixel elctrode.

19. The display device of claim 13, further comprising:
a common voltage line receiving a reference voltage externally provided; and
a conductive spacer disposed between the common voltage line and the common electrode,
wherein the reference voltage applied to the common voltage line is transferred to the common electrode via the conductive spacer.

20. The display device of claim 19, wherein the first insulation layer is formed on the common voltage line, the first connection lines and the dummy line, and a third contact hole is formed through the first insulation layer to expose a selected region of the common voltage line.

21. The display device of claim 20, wherein the conductive spacer is formed in the third contact hole to electrically connect the common voltage line and the common electrode.

* * * * *